Feb. 15, 1955    H. C. FLINT    2,702,078
ZIGZAG SPRING CUSHION CONSTRUCTION
Filed June 13, 1951    5 Sheets-Sheet 1
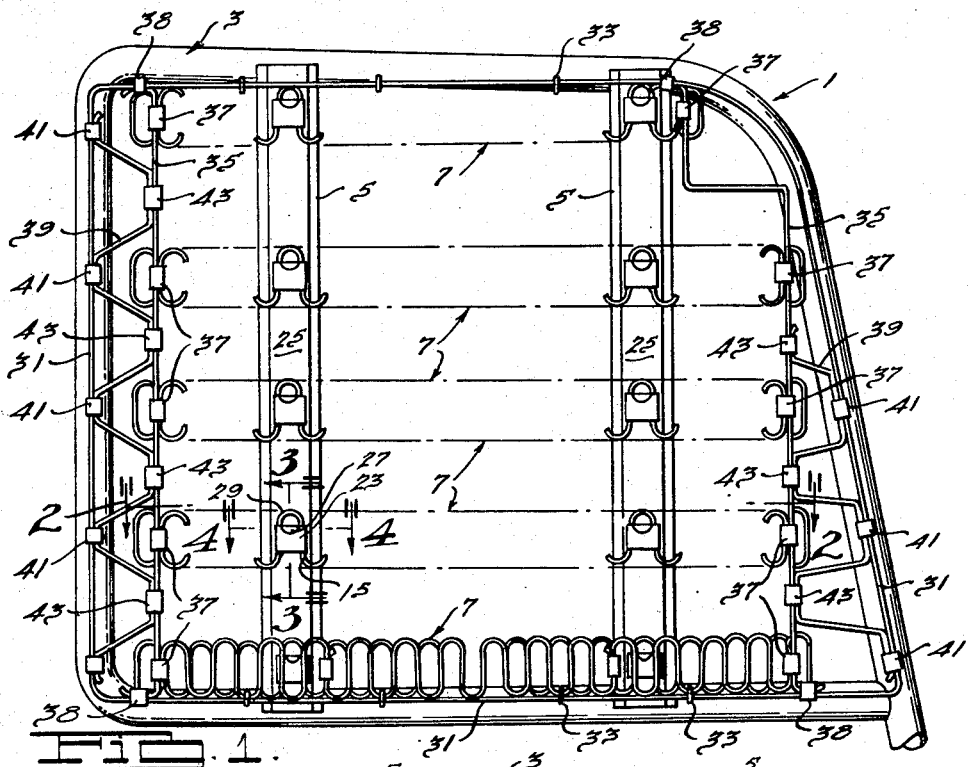
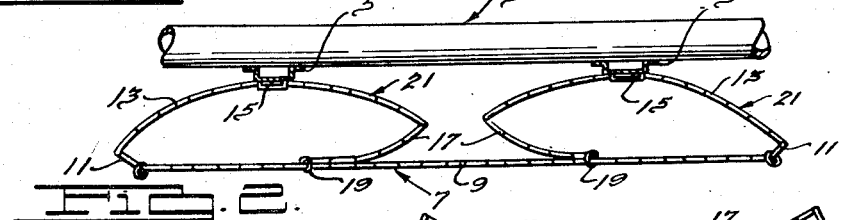
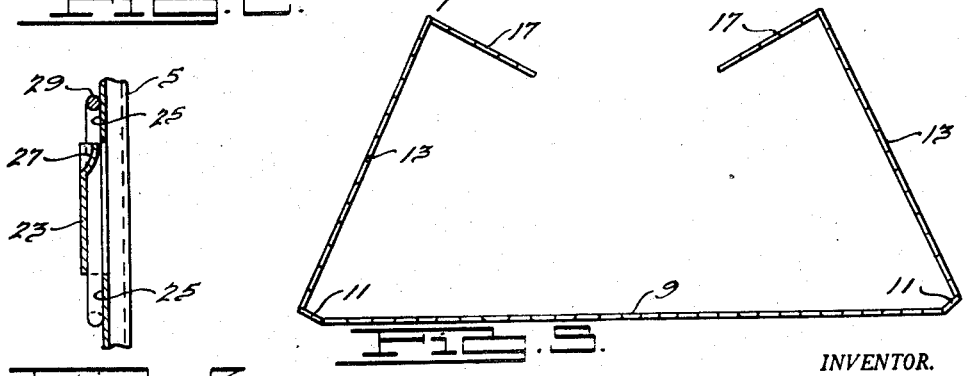
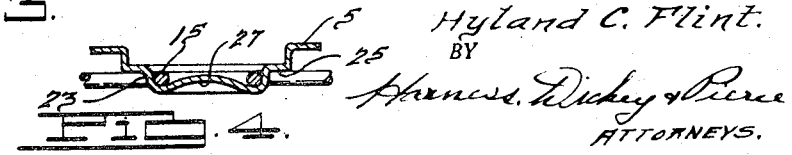
INVENTOR.
Hyland C. Flint.
BY
Harness, Dickey & Pierce
ATTORNEYS.

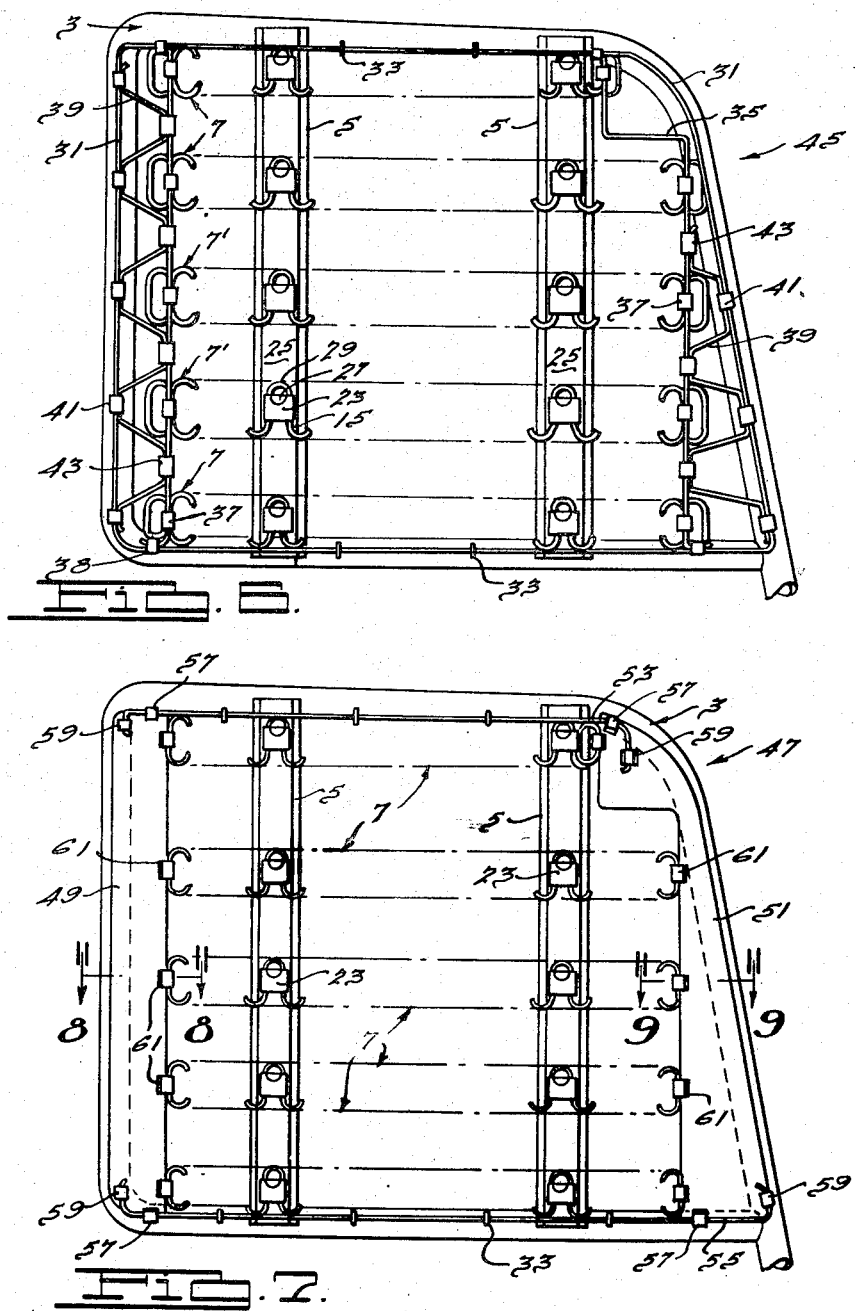

Feb. 15, 1955 H. C. FLINT 2,702,078
ZIGZAG SPRING CUSHION CONSTRUCTION
Filed June 13, 1951 5 Sheets-Sheet 3
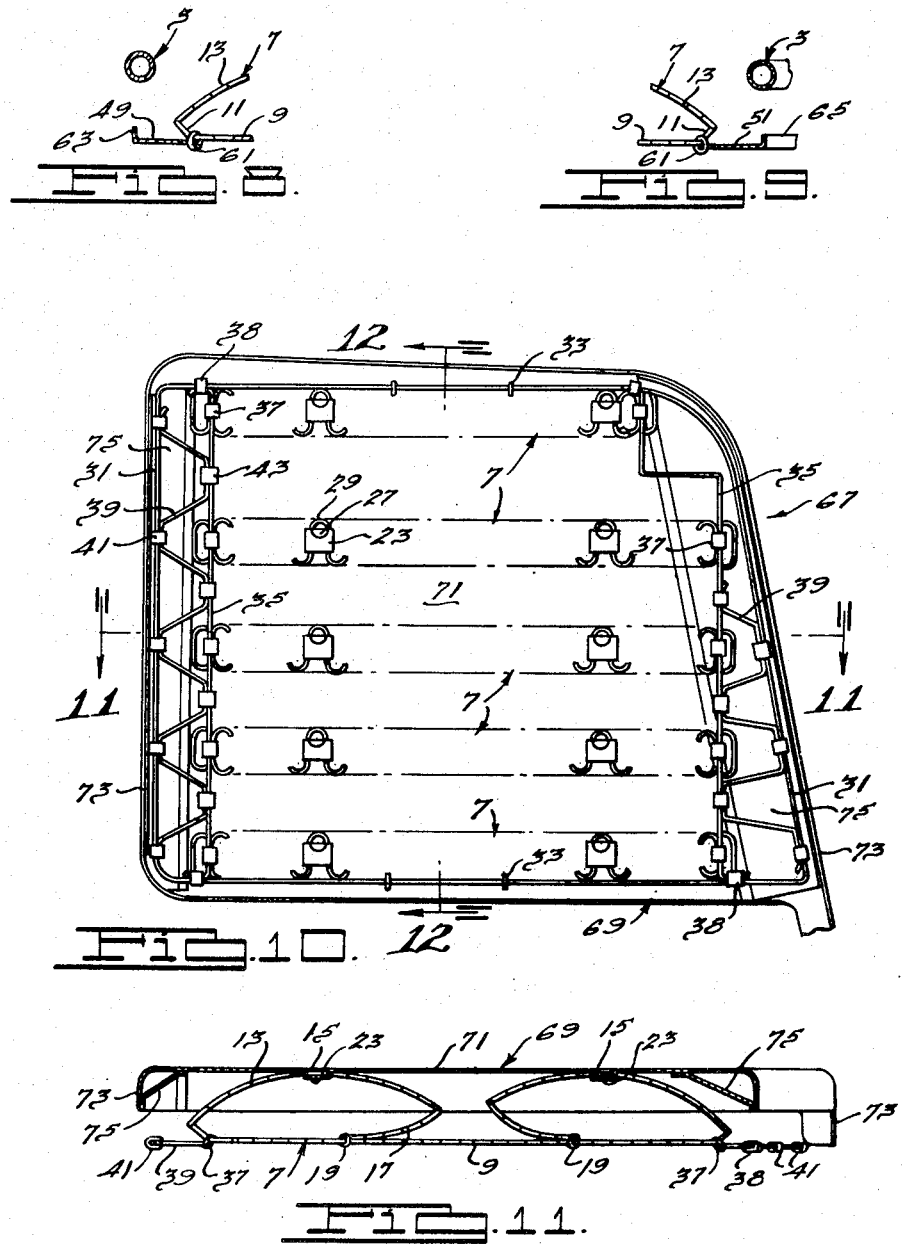
INVENTOR.
Hyland C. Flint.
BY
Harness, Dickey & Pierce
ATTORNEYS.

Feb. 15, 1955 — H. C. FLINT — 2,702,078
ZIGZAG SPRING CUSHION CONSTRUCTION
Filed June 13, 1951 — 5 Sheets-Sheet 4
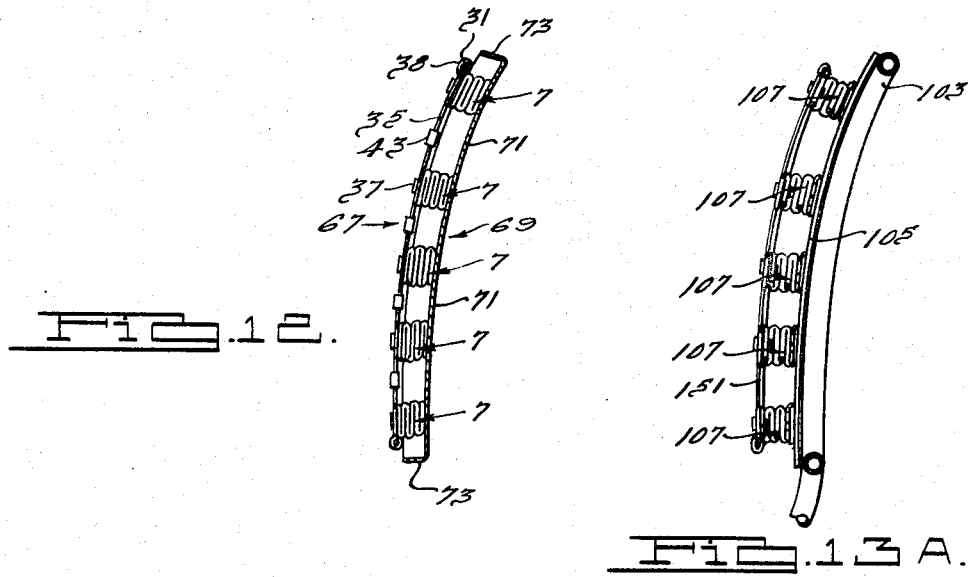
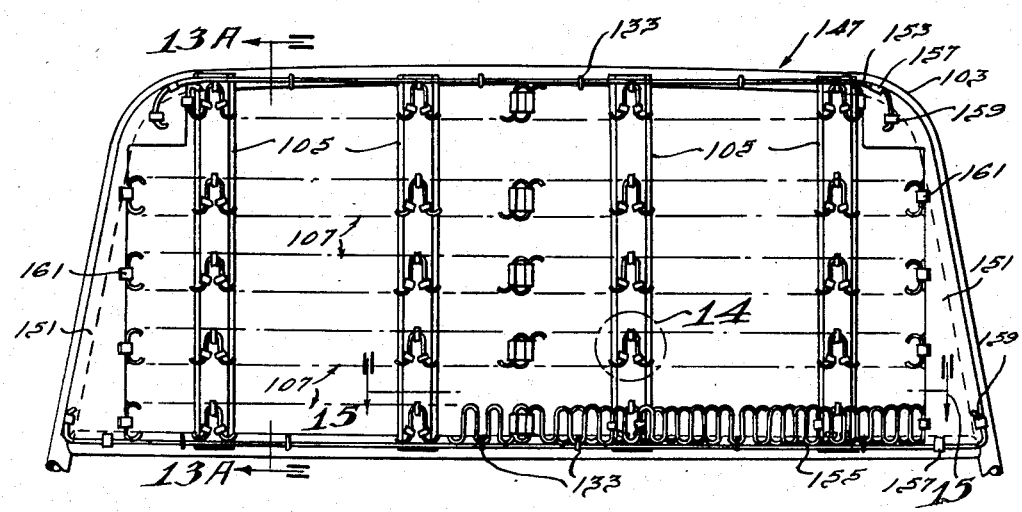
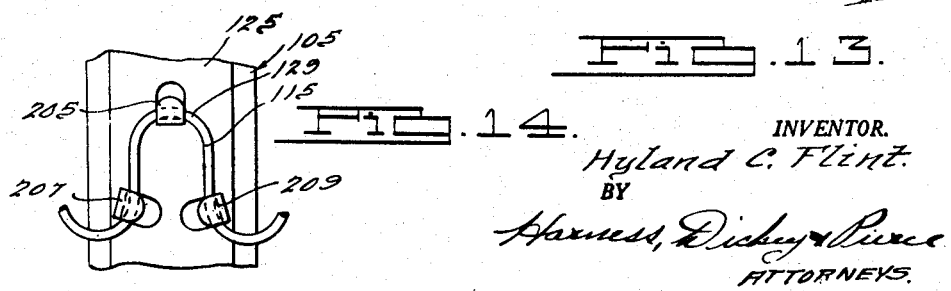
INVENTOR.
Hyland C. Flint
BY
Harness, Dickey & Pierce
ATTORNEYS.

Feb. 15, 1955     H. C. FLINT     2,702,078
ZIGZAG SPRING CUSHION CONSTRUCTION
Filed June 13, 1951     5 Sheets-Sheet 5
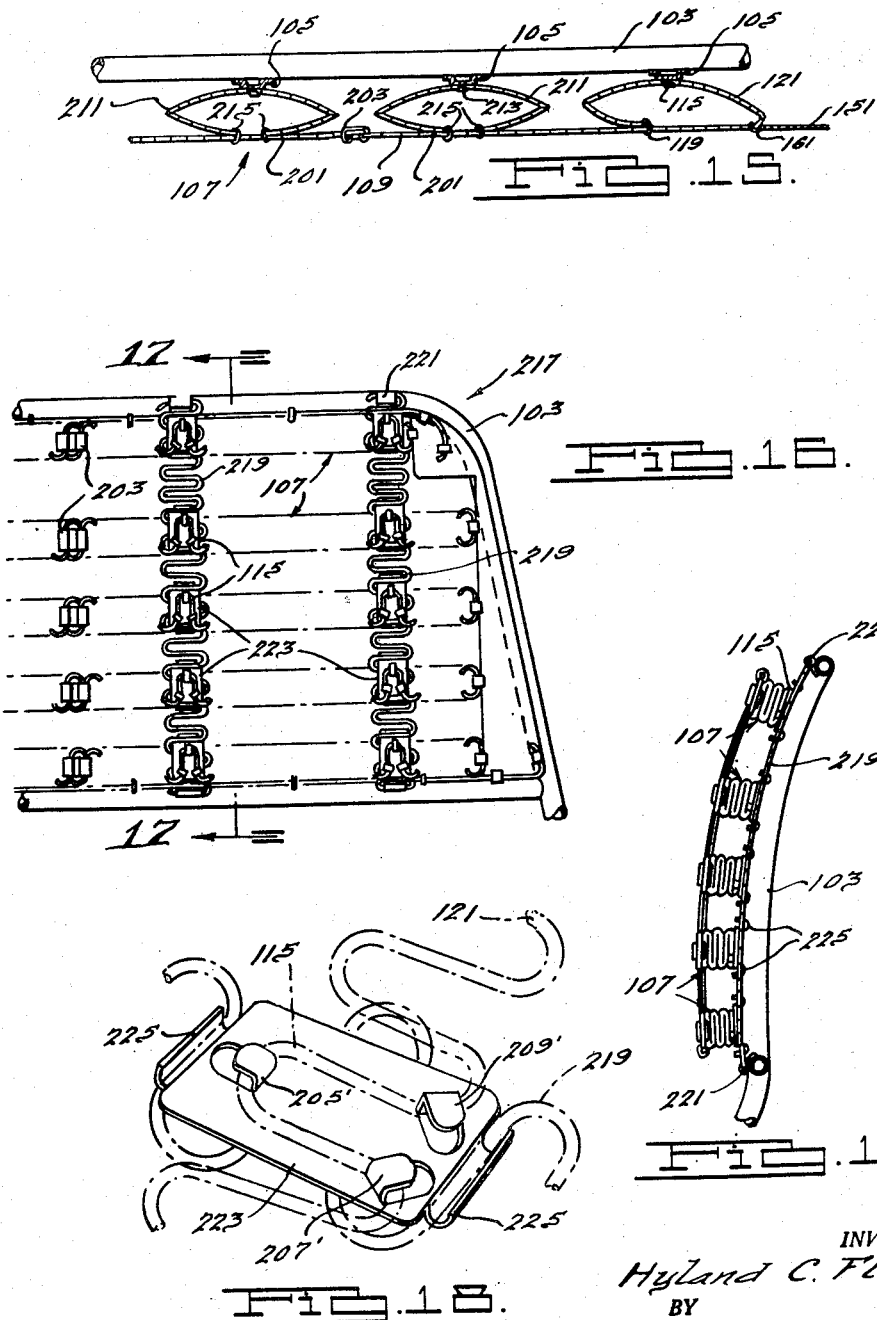
INVENTOR.
Hyland C. Flint.
BY
Harness, Dickey & Pierce
ATTORNEYS.

United States Patent Office 2,702,078
Patented Feb. 15, 1955

2,702,078

ZIGZAG SPRING CUSHION CONSTRUCTION

Hyland C. Flint, Birmingham, Mich., assignor to American Metal Products Company, Detroit, Mich., a corporation of Michigan Application June 13, 1951, Serial No. 231,351

5 Claims. (Cl. 155—179)

This invention relates to spring cushion constructions and, in particular, refers to constructions embodying sinuous or zigzag spring strips.

The use of sinuous spring strips in certain types of spring cushion constructions has become increasingly wide spread in recent years. For example, in the automobile field, the sinuous spring strip is widely used in back and seat cushion constructions and the latter have proved to be durable, comfortable, and economical of manufacture. In the sinuous spring cushion constructions, the considerations relevant to the contour or relaxed appearance of the cushion sometimes conflict with the proper disposition of the sinuous spring elements so as to obtain the most desirable resilience throughout the entire area of the cushion.

In the past, it has been conventional practice to dispose sinuous spring elements in back cushion constructions for automobiles so that they are extended from the top to the bottom of the cushion, that is vertically when the cushion is in its operative position. The present invention, contrariwise, employs sinuous spring strips which are disposed horizontally or from side to side of the back cushion. In this arrangement, the desired contour or appearance of the back cushion can be obtained somewhat more readily than in the conventional arrangement and it also enables sinuous spring strips to be used which have flat load bearing sections or webs that need not be prestressed in the manner taught by the Kaden Reissue Patent No. 21,263. With the horizontal arrangement of springs as employed in this invention, a desired contour is simply achieved by contouring the frame on which the springs are mounted. Inasmuch as the frame in this arrangement is the primary determinant of the contour of the cushion, more freedom can be taken in arranging the ends of the sinuous spring strip so as to resiliently support the load bearing sections on and space them from the frame in such a way as to obtain the most desirable cushioning effects over the entire area of the back cushion.

In the preferred arrangement of the sinuous spring strips of the present invention, the ends of the strips, which are continuations of the load bearing webs, are bent beneath the web and joined thereto so as to form prestressed generally elliptical loops, the bottoms of which may be secured by clips, preferably of a novel construction disclosed herein, to the frame. If the load bearing section is of substantial length such as in rear seat back cushions, individual elliptical sinuous spring loops may be used at intermediate sections of the web. This particular arrangement of supports for the load bearing webs is particularly comfortable and satisfactory from the standpoint of the other consideration involved in the construction of back cushions.

The invention also provides an improved method for obtaining the desired combination of resilience and stiffness at the vertical edges of the cushion. This is accomplished by the use of a thin strip of sheet metal which is attached to the ends of the load bearing sinuous spring sections and to a border wire encircling the assembly of sinuous springs and defining their periphery.

The invention also provides an improved type of frame on which the sinuous spring assembly can be mounted. This frame comprises a pan that may be formed readily from sheet metal and which may have clip sections formed therein to receive the supporting loops for the sinuous strips. Another improved form of frame disclosed herein resides in the use of sinuous spring strips as elements of the frame on which the sinuous spring cushioning and load bearing strips are mounted.

While the invention is not necessarily limited thereto, the foregoing features and other features thereof are illustrated in the accompanying drawings in connection with automobile back cushion constructions in which:

Figure 1 is a front elevation of a back cushion construction for one-half of the front seat of an automobile, the padding and upholstery having been removed;

Fig. 2 is a section taken along the line 2—2 of Fig. 1;
Fig. 3 is a section taken along the line 3—3 of Fig. 1;
Fig. 4 is a section taken along line 4—4 of Fig. 1;
Fig. 5 is a side elevation of a spring strip constructed in accordance with the present invention prior to stressing of the support loops thereof;
Fig. 6 is a view similar to Fig. 1 showing a modified form of the invention;
Fig. 7 is a view similar to Fig. 1 showing another form of the invention;
Fig. 8 is a section taken along the line 8—8 of Fig. 7;
Fig. 9 is a section taken along the line 9—9 of Fig. 7;
Fig. 10 is a view similar to Fig. 1 of another form of the invention;
Fig. 11 is a section taken along the line 11—11 of Fig. 10;
Fig. 12 is a section taken along the line 12—12 of Fig. 10;
Fig. 13 is a view similar to Fig. 1 of a back cushion for receiving more than one occupant;
Fig. 13A is a section taken along the line 13A—13A of Fig. 13;
Fig. 14 is a view of the construction within the circle 14 of Fig. 13;
Fig. 15 is a section taken along the line 15—15 of Fig. 13;
Fig. 16 is a view similar to that of Fig. 13 showing another modified form of the invention;
Fig. 17 is a section taken along the line 17—17 of Fig. 16; and
Fig. 18 is a perspective view of a clip for attaching the spring units to the sinuous support sections of a frame in Fig. 16.

Referring first to Figs. 1–5, a seat back construction 1 for automobiles is illustrated and includes a tubular frame 3 of a conventional type. A pair of hat-shaped channel bars 5 extend between and are welded to the top and bottom sections of the frame 3. Extending from side to side of the frame 3 are a plurality of vertically spaced, parallel zigzag or sinuous spring strips 7, made up of adjacent oppositely facing U's, which coact to resiliently support the back of a person resting against the spring construction.

The spring strips 7 illustrated are each similar in shape to the others and each has a flat web or load bearing section 9. At opposite ends of the web one U-shaped loop of the spring is bent rearwardly and outwardly on preferably about a 45 degree angle as shown at 11. From each loop 11, the wire is bent rearwardly (on preferably an angle slightly less than 90 degrees) in a section 13 that presents a convex rear face. These sections 13 continue beyond the loops 15 of inflection, i. e., loops which are parallel to the web 9, until they are approximately midway between the loops 15 and the web 9. At this point, each spring 7 is bent outwardly and forwardly on an angle of about 45 degrees in a section 17 that presents a convex front side. The end of each section 17 is secured to the web 9 by clips or rings 19. It will be observed from Fig. 2 that the parts of the strips 7 which support the webs 9 (comprising sections 11, 13, and 17) are of a shape that, for want of a more appropriate term, may be referred to as elliptical and are identified in the drawings by the reference numerals 21. The loop 15 of each support 21 is secured to a bar 5 by insertion between a U-shaped section 23 that is pressed outwardly from the web 25 of the bar and the web 25 itself. A depression 27 may be formed in one end of the section 23 to lie in the path of the bight 29 of the spring section 15 beneath it and thereby prevent undesired removal of the spring.

It is to be noted that the spring strips 7 extend horizontally rather than in the vertical manner common in the past. Thus the web 9 may be flat as illustrated and the necessity of prearching eliminated, the required contour from top to bottom being easily obtained by properly contouring the frame 3 and channels 5 (see Figs. 12, 13A, and 17). Each strip 7 may be formed from an originally flat piece of sinuous or zigzag spring by bending the various sections in the fashion illustrated in Fig. 5. The ends of the strip are secured by the clips 19 to intermediate points on the web 9 in such a manner as to prestress the support 21 and cause the bowing of the sections 13 and 17. The supports 21 are spaced from each other so that the central section of the web intermediate the supports, which is the area normally contacted by the back of a person using the seat, will have a tendency to be softer than the edges of the construction and to cradle the person's back.

A border wire 31 extends around the spring strips 7 and directly in front of the elements of the frame 3. Suitable clips 33 attach the top and bottom sections thereof to the outer edges of the webs 9 of the top and bottom strips 7. Vertical connecting wires 35 are connected by clips 37 to the ends of the webs 9 of each strip 7 and serve to maintain the vertical spacing of the strips, the ends of the wire 35 being secured to top and bottom sections of the border wire by clips 38. The wires 35 are connected to and support the side portions of the border wire 31 by way of reversely bent connector wires 39 that are alternately secured to the border wire 31 and connecting wires 35 by clips 41 and 43, respectively. As will be understood, upholstery and padding (not shown) are applied over the strips 7 in a conventional manner.

The major share of the load applied to the back cushion is located in the central areas of the cushion. This is provided for in the embodiment of Fig. 1 by spacing the strips 7 closer together in the middle of the cushion than at the top edge. In the cushion 45 of Fig. 6, however, this concentration of load is provided for by using spring strips 7' at the central levels that are formed of heavier wire than the remaining strips 7, all of the strips being evenly spaced, however. This is the only difference between the embodiments of Figs. 1 and 6.

Figs. 7-9 show a back cushion 47 in which the construction and arrangement of the spring strips 7 are the same as in cushion 1 of Fig. 1. In the embodiment of Figs. 7-9, however, left- and right-hand plates or webs 49 and 51, preferably of sheet metal, are substituted for the side sections of border wire 31 and the connector wires 35 and 39. A comparison of Fig. 7 and Fig. 1 will show that the webs 49 and 51 are of the same shape as the areas covered by the border and connector wires of Fig. 1. The top and bottom sections 53 and 55 of the border wire 31 are retained and they are attached to the webs by clips 57, the ends thereof preferably being bent at an angle and secured flat against the webs by clips 59. The ends of the spring strips webs 9 are secured to edges of the plates 49 and 51 by clips 61 which pass through suitable apertures adjacent the edges of the plates. The webs 49 and 51 are formed from rather thin sheet and the outside edges of the plates 49 and 51 are turned rearwardly in flanges 63 and 65, as seen in Figs. 8 and 9, to provide a certain amount of strength but principally to prevent the edges from cutting the padding or upholstery. The side webs 49 and 51, when formed of thin flexible sheet, provide that peculiar type of durable softness that is needed at the edges of a cushion and also effectively distributes the load from one web 9 to the others.

The back cushion 67 of Figs. 10-12 embodies an assembly of strips 7, border wire 31, and connector wires 35 and 39 which is the same as that shown in Fig. 1. In this modification, however, the assembly is mounted in a pan 69 that is preferably formed of sheet metal. The pan has a back web 71 and a flange 73 surrounding it and may be reinforced by suitable gussets 75. The loops 15 of the spring strip supports 21 are anchored to the pan 69 by suitable means, preferably clips formed in the pan that are the same as the clips formed in channels 5 and shown in Figs. 3 and 4. As shown in Fig. 12, the required contour is obtained by making the front of the web 71 convex. It may again be observed how the springs 7 are more closely spaced in the central and lower parts of the cushion 67, that is, in the regions where maximum support for a person's back is needed.

The cushions 1, 45, 47, and 67 that have already been described have been shown in the form of backs for the front seat of a two-door sedan type automobile, i. e., backs that must be moved forwardly to allow passengers to enter and leave the rear seat and which therefore are only one-half the width of the seat. It is apparent that the invention is not confined to this type of back cushion and, as an illustration of this fact, Figs. 13-15 show the invention embodied in a full width back cushion for an automobile.

Except for the spring strips and the clips for attaching them to the frame, there are no substantial differences between the full-size cushion and the half-size cushion 47 of Fig. 7. The cushion of Figs. 13-15 will therefore be identified by the reference numeral 147 and other elements thereof that are similar to the elements described in connection with cushion 47 will be identified by the same reference numerals plus one hundred. Thus cushion 147 has a frame 103 that is formed from tubular stock to the desired shape. Four hat-shaped vertical channel bars 105 are horizontally spaced from each other and welded at their opposite ends to top and bottom sections of the frame 103. Horizontal, vertically spaced sinuous spring strip assemblies 107 which present load bearing webs 109 are mounted on the channels 105 in a manner to be presently described. The opposite ends of the webs 109 are secured by clips 161 to side plates 151. Top and bottom border wires 153 and 155 are secured to the plates 151 by clips 157 and also have their ends bent at an angle and laid flat on the plates 151 and secured thereto by clips 159. Clips or rings 133 connect the border wires 153 and 155 to the top and bottom edges of the marginal webs 109.

As best shown in Fig. 15, each of the spring strip assemblies 107 which provide webs 109 is composed of several individual sinuous spring strips since the span of the web is too great for a single piece construction such as shown in the preceding embodiments. Opposite ends of the assemblies 107 are made of identically formed pieces that include flat web sections 201 that overlap at the center of the construction, the inner ends of the sections 201 being secured together by a suitable clip 203. The outer ends of the sections 201 are bent around in sections 121, that are similar to sections 21 already described, and the end edges of the pieces are secured to intermediate points on the sections 201 by clips 119. Central loops 115 of the sections 121 may be secured to the webs 125 of the channels 105 by means shown best in Fig. 14. This means comprises three tongues 205, 207, and 209 struck up from the web 125; the tongues have ends that are bent laterally so as to provide hooks for overlying the wire of a loop 115 and holding against the surface of the web 125. Tongue 205 faces outwardly with respect to the strip that it secures to the channel 105 and the bight 129 of the loop 125 is placed inside of it when the spring strip assembly 107 is secured to the frame. The tongues 207 and 209 are slightly oblique to the straight sections of the loop 115 and face toward each other. By compressing the loop 115 slightly to move the straight sections toward each other, the loop 115 is placed over tongue 205 and inside of tongues 207 and 209 so that upon release of the compression the loop 115 will expand against the tongues 207 and 209 and thus be held in place on the channel 105. Intermediate points on the web sections 201 are supported on intermediate channels 105 by elliptical pieces 211 of sinuous wire. Central back loops 213 of the pieces 211 are secured to the channels 105 by means of the tongues shown in Fig. 14 and the ends of the pieces are secured to the sections 201 by clips 215. Thus, the web 109 is supported on the four channels 105 and there are three sections of the web between adjacent channels which correspond to the ordinary width of the back cushion which is such as to receive three persons.

Figs. 16-18 show a cushion 217 which is the same as cushion 147 except that sinuous spring strips 219 are substituted for the channels 105. The ends of the strips 219 are secured, preferably pivotally, to the top and bottom sections of the frame 103 by suitable clips 221. The loops 115 and 213 of the strip assemblies 107 may be secured on the strips 219 by means of clips 223. Each clip 223 is a flat piece having tongues 205', 207', and 209', similar to tongues shown in Fig. 14, struck up to receive the loops 115 and 213. The ends of the clip piece 223 are formed into U-shaped sections 225 that receive straight sections of the strips 219. As indicated in Fig. 15, the clips 223 are placed on the strips 219 and the sections 225 snapped underneath and around straight sections of the strips. The tongues 205', 207', and 209' are thus exposed and the loops 115 and 213 are readily snapped into place thereon whereby the clips 223 secure spring assemblies 107 to strips 219. It will be appreciated that the strips 219 contribute additional resiliency to the back cushion but still enable it to maintain a desired contour as defined in cushion 217 by the convex shape of the frame 103.

Various modifications may be made in the forms of the invention hence it is not intended to limit it to the precise structure illustrated herein.

What is claimed is:

1. In a back cushion having a frame adapted to be disposed in a predetermined position with respect to the vertical and horizontal, a sinuous spring strip having a load bearing web extending horizontally from side to side of said frame and including oval-shaped sinuous spring portions spacing it from and securing it to said frame, said oval-shaped portions being straight diverging arms extending from the ends of a straight portion forming a load bearing web before assembly on said frame.

2. In a back having a frame adapted to be disposed in a predetermined position with respect to the vertical and horizontal, said frame being contoured to present a convex front face, a plurality of sinuous spring strips having load bearing webs extending horizontally from side to side of the frame, said strips being vertically spaced apart and including oval-shaped supporting portions spacing the strips from the frame so that said webs follow the contour of the frame, said oval-shaped portions being straight diverging arms extending from the ends of said load bearing web before assembly on said frame.

3. In a back cushion having a frame adapted to be disposed in a predetermined position with respect to the vertical and horizontal, said frame being contoured to present a convex front face, a plurality of sinuous spring strips each having a straight load bearing web and arms extending from each end of the web in diverging relation, with the arm ends having a section bent toward each other and disposed at an angle of approximately 90° to the arm portions, the ends of the sections being secured to the web to have the sections and arm portions form a closed figure beneath the web extending inwardly from each end thereof, and rows of spaced clips located intermediate the opposite edges of the frame and said clips securing the closed figures of the spring strips to the frame.

4. In a back cushion, a frame adapted to be disposed in a predetermined position with respect to the vertical and horizontal, a plurality of sinuous spring strips having load bearing webs extending horizontally from side to side of said frame and including spring elements spacing the webs from and securing them to the frame, the projected area of the frame being larger than the projected area defined by said combined webs, and a flexible metal sheet secured to the edges of said webs and in the plane thereof and of a shape such that the projected area of the combined webs and sheet is substantially the same as that of the frame portion adjacent thereto.

5. A spring strip made of wire bent back and forth into sinuous form, said strip being flat longitudinally of its length, the end portions of the strip being bent from the central portion and extending therefrom in converging relationship to each other, the ends of the end portions extending toward each other in substantially right angular relation to said end portions, said ends and end portions assuming the shape of an arc when the ends are secured to the central portion of the strip inwardly of the ends thereof forming spaced elliptical supports therefor, a frame, supporting members on said frame inwardly of opposite edges thereof, and means securing the elliptical supports of a plurality of said spring strips to said supporting members with the central portions thereof forming a load supporting area.

References Cited in the file of this patent

UNITED STATES PATENTS

| | | |
|---|---|---|
| 1,395,421 | Johnson | Nov. 1, 1921 |
| 2,002,399 | Kaden | May 1, 1935 |
| 2,116,402 | Menge | May 3, 1938 |
| 2,224,824 | Krakauer | Dec. 10, 1940 |
| 2,330,906 | Neely | Oct. 5, 1943 |
| 2,364,500 | Wolofski | Dec. 5, 1944 |
| 2,386,456 | Haberstump et al. | Oct. 9, 1945 |
| 2,526,250 | Matthaei | Oct. 17, 1950 |
| 2,548,968 | Goldstein | Apr. 17, 1951 |
| 2,591,185 | Neely | Apr. 1, 1952 |